Dec. 18, 1928.
W. G. MILLER
1,695,340
HOSE AND TUBE CLAMP
Filed Jan. 17, 1927
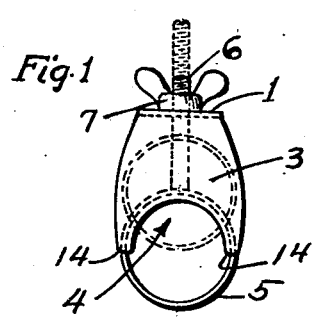
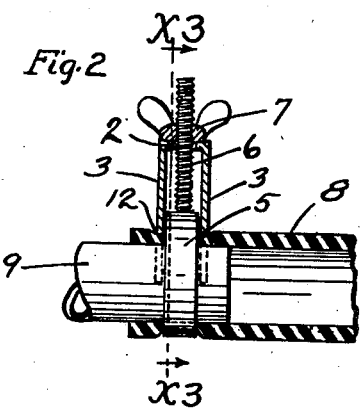
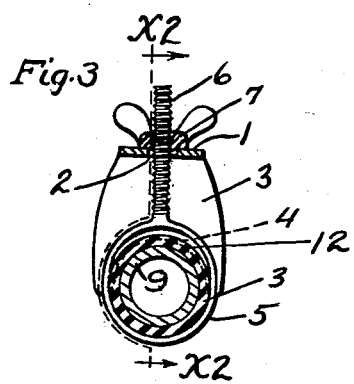
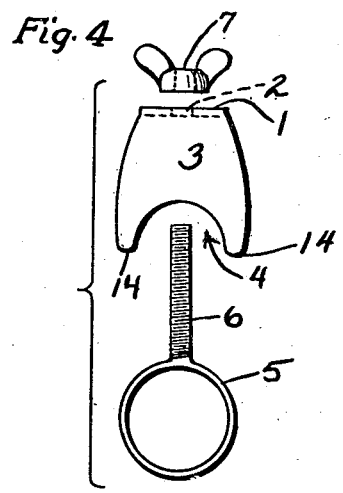
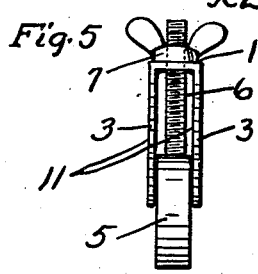
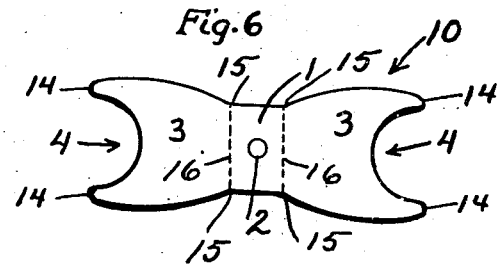
WITNESS
Robt S. Woolsey
INVENTOR
Wilbur G. Miller
by James R. Townsend
his atty Patented Dec. 18, 1928.

1,695,340

UNITED STATES PATENT OFFICE.

WILBUR G. MILLER, OF LOS ANGELES, CALIFORNIA.

HOSE AND TUBE CLAMP.

Application filed January 17, 1927. Serial No. 161,575.

An object of this invention is to provide a light, cheap, simple, easily made clamp that is adapted to be used in securing a hose or tube of yielding or compressible material to a rigid nipple, as in the case of applying a rubber hose connection between the radiator and the engine of an automobile.

Other objects are ready application, tightening, loosening and adjustment of the clamp with respect to a compressible hose or tube on a nipple.

This invention comprises a U-shape yoke having a central bridge or head and an orifice through the bridge, and having legs extending parallel to each other from the ends of said bridge and terminating in crotches; a collar movable edgewise between the legs and adapted to fit upon a nipple-supported compressible tube; a threaded stem fixed to the edge of the collar and extending through the orifice; and a nut on the stem outside said yoke adapted to act upon the yoke to move the stem and collar relative to the crotches, and to dispose the collar entirely within the yoke when the nut is adjusted in one direction so as to protect the said collar against distortion when the same is in extended position and to compress the tube onto the nipple and between said nipple, and the crotches.

A feature of the invention is the construction of the yoke from a simple sheet metal stamping provided with a central hole, and with terminal arcuate notches, to fit upon and compress the yielding tube or hose.

Other objects, advantages and features of invention may appear from the accompanying drawing, the subjoined detailed description and the appended claim.

The accompanying drawing illustrates the invention.

Figure 1 is an elevation of a hose clamp constructed in accordance with this invention and showing in dotted lines the adjustable retracted position of the collar and its stem.

Fig. 2 is a side elevation partly in section on line $x^2$, Fig. 3, showing the compressible tubing clamped on a connection nipple.

Fig. 3 is a cross section on line $x^3$, Fig. 2.

Fig. 4 is a view of the clamp disassembled.

Fig. 5 is an edge elevation of the clamp assembly.

Fig. 6 is a stamping from which the yoke may be bent up.

The head, cross piece or bridge 1 of the yoke has a central orifice 2 and has two elongated legs 3 that extend in parallelism with each other and are provided with terminal crotches 4 adapted to receive and fit upon one side of a nipple-supported compressible tube or hose. 5 indicates a collar adapted to fit upon such tube and provided with a threaded stem 6 adapted to slip through the orifice 2 and to receive a nut 7 outside the yoke, adapted to act between the bridge 1 and the stem to force the collar 5 upwardly within said yoke to compress the nipple-supported compressible tube 8, against the crotch, and onto and around its supporting nipple 9.

The yoke may be formed of a sheet metal stamping 10 and said stamping may be bent along parallel lines 11 equally spaced from the orifice 2, and the stamping is thus brought into U-shape with crotch terminals as indicated in Figs. 4 and 5.

The collar 5 may be a ring of thin flexible metal that will, under tension from the nut operated stem 6, conform to one half of the compressible tube 8 on the non-compressible nipple 9; and a like office is performed by the crotches 4 on opposite sides of the collar as said ring is drawn tight against the compressible tube.

The arcuate portions of the crotches, practically conform respectively in radius to the radius of the proposed compressed portion 12 of the hose 8.

The clamps will be of different sizes to accommodate the different diameters of hose and the collar 5 is of such diameter that it fits tightly upon the compressible tube or hose 8.

In practical manufacture the yoke may be made from the stamping 10 of sheet metal as illustrated in Fig. 6, the crotches being brought into parallelism as in Fig. 5, by bending along the lines 11.

In practice the clamp is put into use by inserting the tube or hose through the collar 5 and then bringing the yoke into position with the threaded stem 6 inserted through the orifice 2 and the nut 7 screwed thereonto, without causing much, if any compression of the tube. Then the tube will be applied to the non-compressible nipple 9 and the nut 7 tightened, thus forcing the collar toward the cross piece 1 and compressing the tube between the nipple, the collar and the two crotches as indicated in Fig. 2.

It is understood that the stem may be fitted with any desired form of thumb nut or wrench nut.

The recesses 4 of the crotches are substantially of semicircular form plus tangential terminals 14 that form guides between which the hose or tube may be forced thus to afford a preliminary incipient compression of the hose or tube on opposite sides of the nipple as the hose enters the crotch. The stem 6 is of a length greater than the space between the crotch and the bridge so that the stem may protrude from the bridge to receive the nut before the crotch is tight on the hose.

By providing yoke 4 with elongated legs provision is made for disposing the collar 5 entirely within the yoke, as illustrated in dotted lines in Fig. 1, when the nut is adjusted in one direction so as to protect the collar against distortion when the same is in extended position.

The lateral edges 15 of each leg 3 of the stamping 10 as shown in Fig. 6 diverge from each other to form obtuse angles 15 with the bridge 1 and practically mark the ends of the parallel bending lines 16 which are equidistant from the orifice 2, and at which lines the stamping is thus adapted to be bent to form the completed yoke; and the stampings may be made in large quantities and kept flat for storage and transportation until it is desired to make up a batch of the clamps; whereupon, by simply bending the stampings at the bending lines 16, and setting the bend with a suitable die, not shown, the yoke is completed.

I claim:—

The clamp set forth comprising a U-shape yoke having a central bridge and an orifice through the bridge, and having legs extending parallel to each other from the ends of said bridge and terminating in crotches; and to dispose said collar entirely within said yoke when the nut is adjusted in one direction; a collar movable edgewise between the legs and adapted to fit upon a nipple-supported compressible tube; a threaded stem fixed to the edge of the collar and extending through the orifice; and a nut on the stem outside said yoke adapted to act upon the yoke to move the stem and collar relative to the crotches, and to compress the tube onto the nipple and between said nipple and the crotches.

In testimony whereof, I have hereunto set my hand at Los Angeles, California, this 6th day of January, 1927.

WILBUR G. MILLER.